I. MORSE.
Operating Churns.
No. 77,077.
Patented April 21, 1868.
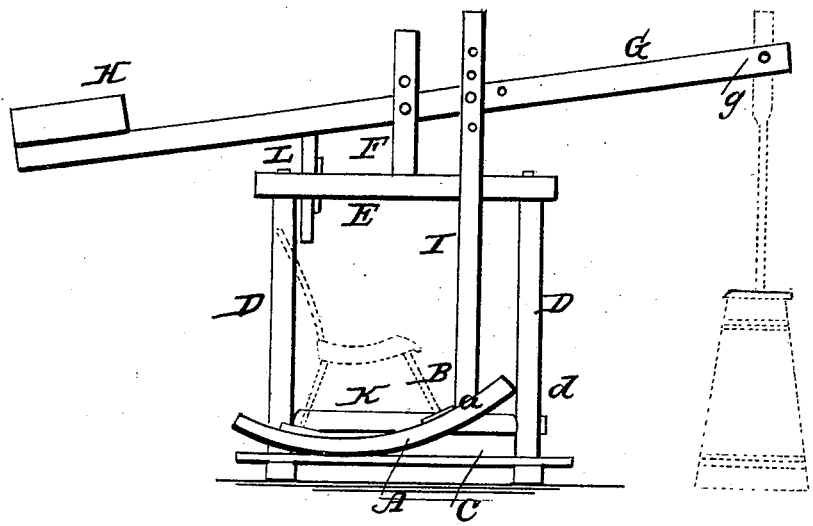
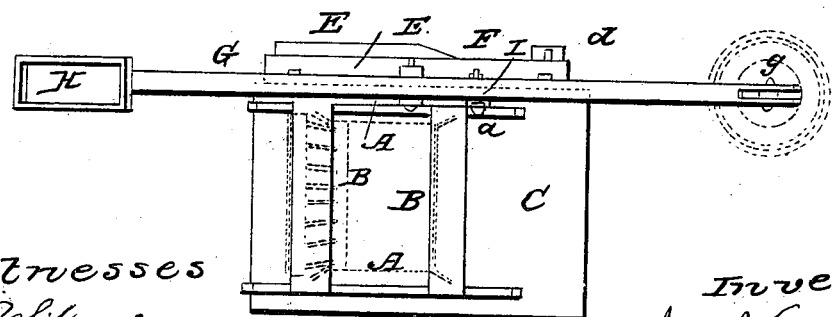
Witnesses
Inventor
Ira Morse
by Prindle & Co

United States Patent Office.

IRA MORSE, OF WEST FRANKLIN, PENNSYLVANIA.

Letters Patent No. 77,077, dated April 21, 1868.

IMPROVEMENT IN MACHINE FOR OPERATING CHURNS, &c.

The Schedule referred to in these Letters Patent and making part of the same.

TO ALL WHOM IT MAY CONCERN:

Be it known that I, IRA MORSE, of West Franklin, in the county of Bradford, and in the State of Pennsylvania, have invented an improved Machine for Operating Churns; and do hereby declare that the following is a full, clear, and exact description thereof, reference being had to the accompanying drawings, making a part of this specification, in which—

Figure 1 is a side elevation.

Figure 2 is a top view.

Letters of like name refer to like parts in each of the figures.

The nature of my invention consists in providing means whereby the operation of churning, instead of being laborious, becomes a recreation, to which end the following-described improvement is designed.

In the annexed drawings, A represents a pair of rockers, connected together by two cross-pieces, B, and resting upon the platform C, to which is attached a frame. composed of two uprights, D, and a cross-bar, E, from the centre of which rises a forked post or crotch, F.

G represents a lever, working in the fork F, where it is held by a pin, f, which passes through both fork and lever, and forms a fulcrum for the latter.

One end of the lever G is forked, g, so as to admit the handle of a churn-dasher, which is fastened by a pin, while upon the other end is a box, H, for the purpose of containing water, sand, or other weight, to counterbalance the dasher and cream.

I is a bar, one end of which is connected to the lever G by a pin, while the other is connected, in a similar manner, to the rockers at a.

K is a lever, hinged near the bottom of one of the uprights, at d, to which the bar I may be connected when detached from the rocker, for the purpose of working the machine with the foot.

L is a block, passing through the cross-bar E, in which it is held by a wedge that allows it to be raised or lowered beneath the lever G, for the purpose of regulating its motion.

The operation of this machine is as follows, viz:

The churn-dasher is attached to the lever G, and sufficient water, sand, or other weight, placed in the box H to counterbalance the dasher. A chair is now placed upon the cross-pieces B, its feet resting in holes made for the purpose, in which the operator is seated, when, by rocking back and forth, the lever G is caused to vibrate, working the dasher and churning the cream.

The advantages possessed by this improvement over all others in use are, that it renders the heretofore laborious task of churning a pleasant recreation, during which a woman can be engaged in reading, sewing, knitting, &c., and that it is simple in construction, and can be made by any farmer at little cost.

Having thus fully set forth the nature and merits of my improvement, what I claim as my invention, and desire to secure by Letters Patent, is—

The within-described machine for operating churns, composed of the rockers a, cross-bars B, platform C, frame D and E, forked post F, lever G, box H, bar I, lever K, and block L, for the purpose and substantially as herein described.

In testimony that 1 claim the foregoing, I have hereunto set my hand, this 10th day of March, 1868.

IRA MORSE.

Witnesses:
   F. R. HICKOK,
   B. S. SEARS.